W. B. PRATT.
SOLID TIRE AND METHOD OF MAKING THE SAME.
APPLICATION FILED JAN. 3, 1919. RENEWED NOV 14, 1919.

1,349,914. Patented Aug. 17, 1920.

Inventor
William Beach Pratt
Attorneys

UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

SOLID TIRE AND METHOD OF MAKING THE SAME.

1,349,914.      Specification of Letters Patent.      Patented Aug. 17, 1920.

Application filed January 3, 1919, Serial No. 269,467. Renewed November 14, 1919. Serial No. 338,116.

*To all whom it may concern:*

Be it known that I, WILLIAM BEACH PRATT, a citizen of the United States, residing at Wellesley, in the county of Norfolk and State of Massachusetts, have invented new and useful Improvements in Solid Tires and Methods of Making the Same, of which the following is a specification.

This invention relates to solid tires such as are used on automobile trucks, and has for its object, first, to reduce the cost of production; second, to increase the durability and wearing qualities; and, third, to obtain a greater degree of resiliency than has heretofore been commercially possible.

It is common practice, in the construction of solid tires, to use a corrugated iron rim on which a hard rubber band or layer is eventually vulcanized to form a closely fitting base. On this hard rubber base is laid the tread proper, and the rim with the various layers of different rubber compounds is subjected to vulcanization under pressure in suitable molds. One of the chief faults found with tires so constructed is primarily due to the fact that the hard rubber base frequently cracks and separates from the rim and destroys the value of the tire before the tread has worn out. In fact, in the initial side-strain tests to which such tires are subjected before they are marketed, many tires are found to be below standard because of the inherent frailties of the hard rubber band or base, thus occasioning great loss, or a greatly increased factor of cost in the production of marketable tires.

According to my invention, I am able to dispense with the hard rubber base as a sine qua non, as I provide a binder which serves to interlock the tread to the rim, making it possible to employ for the whole tire, rubber compounds of different specific gravity but of the same degree of sulfur saturation, so that the process of vulcanization may be carried on under the most favorable auspices, and a better compound insured. Moreover, I provide a fibrous material for incorporation in the tire treated or saturated with a substance by which it is rendered proof against oxidation decay. That is, instead of employing friction-cloth or the like, in which the fibers are injured by the manipulation necessary to cause the rubber coating to adhere to the fiber, I provide a fabric or fibrous material in which the fibers are treated with a non-colloidal sulfur-terpene compound which will completely protect the fibers and will vulcanize onto rubber. Hence as much or as little of the entire tread as may be desired may be built up of the converted fibrous material with intervening layers of rubber. In fact, only the base of the tread may consist of one or more layers of the impregnated fiber, which is firmly united to the iron rim by a layer of the non-colloidal sulfur-terpene compound. I have found that one of the properties of this compound is that, when applied as a paint upon iron or steel, it will adhere thereto without danger of checking or cracking, and serve to unite to the rim both rubber and fabric, in such wise that under prolonged tests no separation occurs.

In practice, I may employ any form of iron rim whether smooth-surfaced or corrugated, and, after applying a coating of non-colloidal sulfur-terpene compound thereto, I proceed to build thereon a base consisting of converted fabric and rubber having compounded therein the desired proportion of litharge or other filler. The balance of the tread may then be built up in any approved manner. Inasmuch as the sulfur-terpene compound may be used to treat cord and rope as well as a woven fabric, I may form the base, and indeed the greater portion if not all of the tread, by wrapping a treated rope or cord in layers of convolutions about the rim with rubber interposed between the layers and the convolutions. Or, if desired, the first layer may consist of a cloth covered wire, the covering of which is treated with the compound.

On the accompanying drawings I have shown two forms of tire, which will serve as illustrating different embodiments of the invention, although of course it will be understood that the invention is capable of other embodiments.

Figure 1:
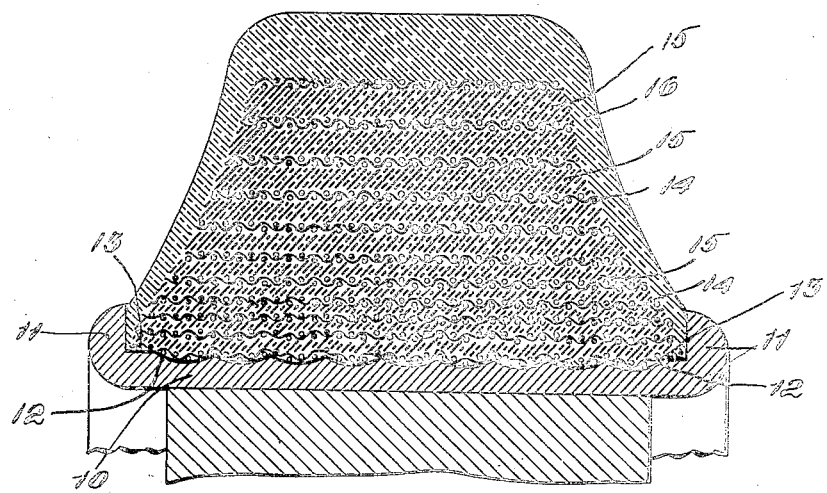
Figure 1 represents in cross section a tire, composed in part of layers of impregnated textile material.

While, as I have already stated, it is unnecessary to use a corrugated rim, in Fig. 1, the iron rim 10 has on its peripheral face between the side flanges, 11, 11, a plurality of wide shallow grooves or corrugations 12. In building up the tire after the face of the rim has been cleaned, I coat it with a relatively thick layer 13 of non-colloidal sulfur-terpene compound.

The sulfur-terpene compound may be prepared from oil of turpentine by the process described in my application Serial No. 328,235, filed October 3, 1919; that is, by digesting oil of turpentine or other non-colloidal terpene with sulfur by heat in a reflux condenser until it is partially or substantially saturated. This compound, which on cooling sets to a hard tough mass and will adhere firmly to glass and metal surfaces, is diluted with a volatile solvent, and is applied in the form of a thick paint. Diluted to a thinner condition, for it goes completely into solution in certain solvents, as pointed out in said application, it is employed not only to coat but also completely to saturate and impregnate various fibrous fabrics, such as rope, cords, woven textile materials, felt, etc., seemingly not only filling the interstices of such fabrics but also entering into the fibers themselves and rendering them proof against oxidation rotting, etc., under the severest tests.

After the face of the iron rim has been coated, including the inner walls of the flanges, I may wrap about the rim one or more layers 13 of impregnated or treated duck. Then I proceed to build up the tread, laying on, in alternation, spiral layers of treated duck 14 and rubber 15. The layers of rubber nearest the rim are preferably of high-specific-gravity compounds, while those nearest the tread surface are preferably of more resilient rubber compounds. Finally, I inclose the layers thus built up, with an exterior layer of low-specific-gravity rubber 16 which ultimately forms the exposed tread surface. The tire is then placed in a suitable mold and is vulcanized under great pressure, as a result of which the sulfur-terpene compound vulcanizes solidly to the rubber, and firmly unites the whole tire with the rim. Of course, in building up the tire, the several layers of fabric are drawn and bound tightly about the rim so as to form finally, with the rubber and the sulfur-terpene compound, a resilient mass of sufficient solidity. Instead of employing duck, I may use other textile materials, such as burlap, linen, hemp, etc.

Figure 2:
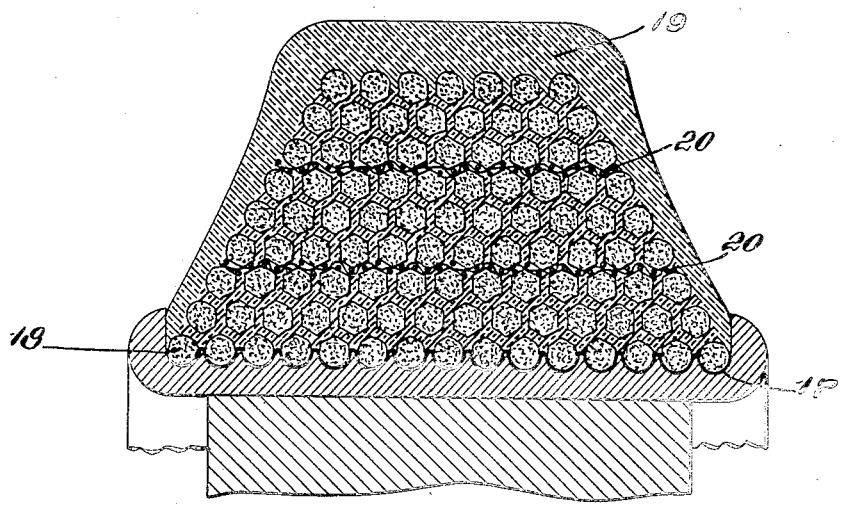
Fig. 2 represents in cross section another form of tire composed in part of impregnated rope.

In Fig. 2, I have shown a form of tire which is adapted for very heavy trucks, and which is built up of rope. In this case, I may use manila or cotton rope, say from $\frac{3}{16}$ to $\frac{1}{4}$ inch or more in diameter, which is first thoroughly treated with the non-colloidal sulfur-terpene compound. The rim 10 has a helical groove 17 on its face between the flanges, adequate in width and depth to receive the rope. The surface of the rim is first coated with the sulfur-terpene compound, and then the rope while under tension is wrapped about the rim to form the first layer as at 18. Next, on the layer thus formed is placed a layer 19 of rubber of the desired kind, preferably litharge-rubber compound of high specific gravity. The rope is then wound in a second layer of convolutions, thereon, so that each convolution will be above the space between the convolutions of the first layer; then a second layer of rubber is laid in place, and so on, until the tire has been built to the desired thickness. The tire in cross section approaches pyramidal form as it is built up, the rope layers decreasing gradually in width. Then an outer coating or layer of rubber as at 19 is laid on the partially formed tire so as to inclose the top and sides thereof, and the structure is vulcanized under great pressure in a mold of appropriate shape.

For strengthening purposes, I may, between the tread surface and the rim, incorporate in the tire one or more layers 20 of treated canvas, which will effectively tie the structure together transversely. Before applying the resilient rubber covering 19, I may, under some circumstances, apply a coating of sulfur-terpene compound upon the exterior of the built-up layers of rope and rubber, but ordinarily this is not at all essential. A tire thus formed as shown in Fig. 2, possesses many advantages, among which are its solidity and resiliency, its freedom from hard or fully saturated rubber, its solid inseparable connection with the rim, its ability to withstand severe side strains, and its great durability and wearing qualities.

Any suitable means may be utilized for securing the ends of the rope, as by fraying the inner end and carrying it across the next adjacent grooves so that convolutions of the rope will engage and bind it in place, or, if desired, the inner end of the rope might be mounted in a hole in the rim.

As I have already stated, I may substitute for the first layer of rope a fabric-covered wire, the coating of which is treated with the sulfur-terpene compound.

In applying the sulfur-terpene compound in solution, it is permitted to dry or set, and this may be expedited by the application of heat, but, instead of dissolving it in a solvent, it may be first heated to a liquid condition for application.

I do not claim herein either the herein described sulfur-terpene compound or its process of manufacture since these form the subject-matter of my said application hereinbefore recited, or a fabric treated with said sulfur-terpene compound, as the same is set forth and claimed in my application Serial No. 270,228, filed January 8, 1919, (renewed May 3, 1920, Serial No. 378,660), or the vulcanized article broadly claimed in my application Serial No. 378,942, filed May 5, 1920, or the process of bonding metal and vulcanized rubber and the article produced thereby as broadly claimed in my application Serial No. 378,941, filed May 5, 1920, for a pneumatic tire as claimed in my application Serial No. 269,468, filed January 3, 1919.

Having thus explained the nature of my said invention, and described a way of making and using the same, although without attempting to set forth all of the forms in which it may be made or all of the modes of its use, what I claim is:—

1. A tire comprising a rim, a solid rubber tread, and a layer of non-colloidal sulfur-terpene compound uniting the tread to the rim.

2. A tire comprising a rim, a solid rubber tread having a fibrous material incorporated therein, and a layer of non-colloidal sulfur-terpene compound uniting said tread and the rim.

3. A tire comprising a rim, a solid rubber tread having a fibrous material incorporated therein, and a layer of non-colloidal sulfur-terpene compound uniting said tread and the rim, said fibrous material having been treated with non-colloidal sulfur-terpene compound.

4. A tire comprising a rim, a layer of non-colloidal sulfur-terpene compound thereon, a layer of fibrous material encircling the first-mentioned layer, and a solid tread portion, the whole being vulcanized together.

5. A tire comprising a rim, a layer of non-colloidal sulfur-terpene compound thereon and adherent thereto, and a tread vulcanized to said layer, said tread comprising alternate layers of rubber and fibrous material.

6. A solid tire comprising layers of rubber and fibrous material treated with a non-colloidal sulfur terpene compound, all vulcanized into a solid coherent mass.

7. A solid tire comprising alternate spiral layers of rubber and fibrous material treated with a non-colloidal sulfur terpene compound and an outer layer of rubber, all vulcanized into a solid coherent mass.

8. A tire consisting of alternate layers of rubber and a helically wound rope, said rope having been treated with a non-colloidal sulfur-terpene compound and said layers being vulcanized into a solid resilient mass.

9. A tire consisting of alternate layers of rubber and a helically wound fibrous body, said body having been treated with a non-colloidal sulfur-terpene compound and said layers being vulcanized into a solid resilient mass, in combination with a rim and a layer of non-colloidal sulfur-terpene compound vulcanized to the tire and locking it to the rim.

10. The herein described method of making a tire, which consists in coating a rim with a non-colloidal sulfur-terpene compound, building thereon layers of rubber and other suitable material, and vulcanizing the same under pressure, causing the first-mentioned layers to unite by vulcanization with the rubber.

11. The herein described method of making a tire, which consists in coating a rim with a non-colloidal sulfur-terpene compound, building thereon layers of fibrous material and rubber in alternation, and vulcanizing the whole into a solid mass.

12. The herein described method of making a tire, which consists in impregnating fibrous material with a non-colloidal sulfur-terpene compound, coating the rim with a like compound, building upon said coated rim alternate layers of said fibrous material and rubber, and vulcanizing the whole under pressure into a solid resilient mass.

13. The herein described process of making a solid tire, which consists in coating an iron rim with a non colloidal sulfur terpene compound, placing thereon a layer of fibrous material treated with a like compound, building the balance of the tire thereon, and vulcanizing the whole into a solid coherent structure.

14. The herein described process of making a tire, which consists in treating a fibrous body with a non-colloidal sulfur-terpene compound, coating the rim with a like compound, wrapping a layer of said fibrous material around and in contact with said coated rim, building alternate layers of rubber and said fibrous material on the first-mentioned layer of fibrous material, and vulcanizing the whole under pressure into a solid resilient mass.

15. The herein described process of making a tire, which consists in treating a fibrous body with a non-colloidal sulfur-terpene compound, coating the rim with a like compound, wrapping a layer of said fibrous material around and in contact with said coated rim, building alternate layers of rubber and said fibrous material on the first-mentioned layer of fibrous material, inclosing the built-up layers by an exterior coating of resilient rubber, and finally vulcanizing the whole under pressure into a solid resilient mass adherent to the rim.

16. The herein described process of making a tire, which consists in treating a rope with a non-colloidal sulfur-terpene compound, winding the rope in layers on the rim with rubber compound between the coils of rope, and vulcanizing the whole mass together under pressure.

17. The herein described process of making a tire, which consists in treating a fibrous material with a non-colloidal sulfur-terpene compound, winding the fibrous material in layers on the rim with interposed layers of rubber between the convolutions, and under pressure vulcanizing the whole into a solid mass.

In testimony whereof I have affixed my signature.

WILLIAM BEACH PRATT.